United States Patent
Gorchian

(10) Patent No.: US 6,375,057 B1
(45) Date of Patent: Apr. 23, 2002

(54) PORTABLE CARRYING APPARATUS FOR HOLDING AND CARRYING A COMPACT DISC PLAYER AND A PLURALITY OF COMPACT DISCS

(76) Inventor: Armen Gorchian, 1349 Linden Ave., Glendale, CA (US) 91201

( * ) Notice: Subject to any disclaimer, the term of this patent is extended or adjusted under 35 U.S.C. 154(b) by 0 days.

(21) Appl. No.: 09/668,533

(22) Filed: Sep. 21, 2000

(51) Int. Cl.$^7$ .................................................. A45F 5/00
(52) U.S. Cl. ...................... 224/682; 224/681; 224/581; 224/930; 150/114; 150/117; 190/111; 190/902; D3/218
(58) Field of Search .................................. 224/581, 582, 224/660, 666, 676, 680, 681, 682, 683, 684, 930; D3/218, 230; 150/106, 114, 117, 119; 190/109, 111, 902

(56) References Cited

U.S. PATENT DOCUMENTS

| | | | |
|---|---|---|---|
| 4,236,657 A | * | 12/1980 | Brunton |
| 4,432,477 A | | 2/1984 | Haidt et al. |
| 4,569,465 A | | 2/1986 | O'Farrell |
| 4,620,653 A | | 11/1986 | Farrell |
| 4,796,790 A | * | 1/1989 | Hamilton |
| 4,834,274 A | | 5/1989 | Johnson |
| 4,921,153 A | * | 5/1990 | Smith |
| 5,255,835 A | | 10/1993 | Burks |
| 5,353,975 A | | 10/1994 | Libertucci |
| 5,395,023 A | | 3/1995 | Naymark et al. |
| 5,439,154 A | * | 8/1995 | Delligatti ................ 150/106 X |
| D394,579 S | * | 5/1998 | Kazanowski |
| 5,746,365 A | | 5/1998 | Scott |
| 6,006,915 A | * | 12/1999 | Moor ...................... 224/929 X |
| 6,056,174 A | | 5/2000 | Minckler |
| D427,766 S | * | 7/2000 | Hillman ........................ D3/218 |
| D428,700 S | * | 8/2000 | Hillman .................... D3/218 X |
| D429,065 S | * | 8/2000 | Hillman ........................ D3/218 |
| 6,129,254 A | * | 10/2000 | Yu ........................... 224/681 X |

* cited by examiner

Primary Examiner—Gregory M. Vidovich
(74) Attorney, Agent, or Firm—Thomas I. Rozsa; Tony D. Chen; Jerry Fong

(57) ABSTRACT

A portable carrying apparatus for holding and carrying a compact disc (CD) player and a plurality of different compact discs and including a top lid portion, a middle CD holding portion and a bottom CD player holding portion. All of the portions of the portable carrying apparatus are hingeably connected together so that they can be independently moved away from each other. The top lid portion is held in place against the CD holding portion of the portable apparatus through attachment means. With the top lid portion moved upwardly and away, the CD holding portion which holds a plurality of compact discs is exposed so that the user can take one or more of the compact discs and remove it from the CD holding portion. Thereafter, the CD holding portion itself can be moved away from the bottom CD player holding portion of the portable carrying apparatus. The CD holding portion is held in place by attachment fasteners on the back of the CD holding portion and the bottom CD player holding portion of the portable carrying apparatus. With the CD holding portion moved away and locked in place against the lid portion by attachment fasteners, the compact disc player itself is opened and the user can place the compact disc into the compact disc player and then push the selected buttons to start, stop, rewind, etc. The buttons themselves extend out from a distal end of the portable carrying apparatus. This further serves to retain the compact disc player within the portable carrying apparatus.

29 Claims, 4 Drawing Sheets

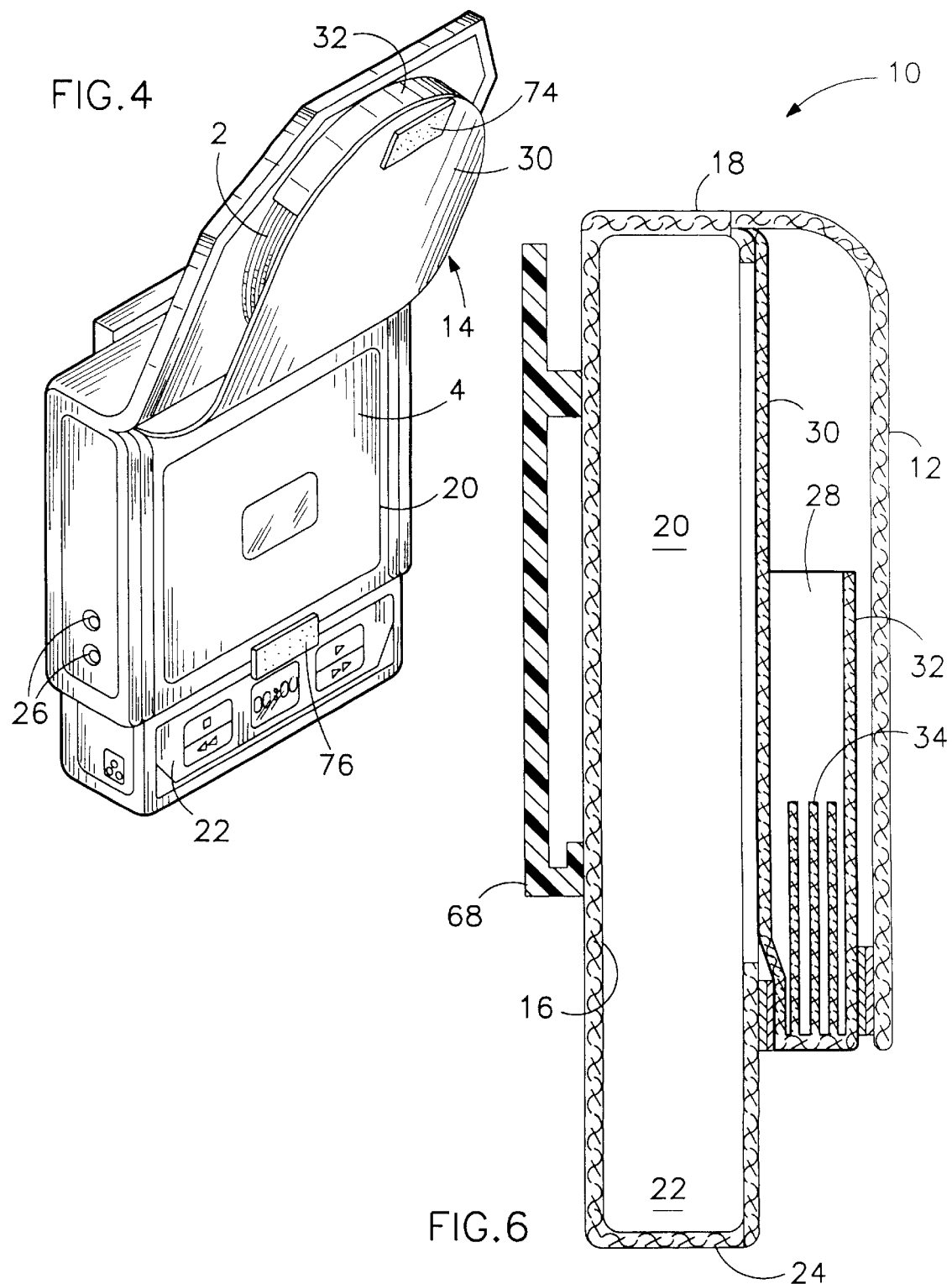

PORTABLE CARRYING APPARATUS FOR HOLDING AND CARRYING A COMPACT DISC PLAYER AND A PLURALITY OF COMPACT DISCS

BACKGROUND OF THE INVENTION

1. Field of the Invention

The present invention elates generally to the field of compact disc players. More particularly, the present invention relates to an apparatus for holding and carrying a compact disc player and a plurality of compact discs adjacent to the body of a person.

2. Description of the Prior Art

Specifically, compact disc (CD) holders are well known in the art. Most of the CD holders are usually bulky and give the appearance of being a purse or bag which most users find to be unattractive. In addition, these CD holders can only carry the CD player and one compact disc within the CD player and do not have room for carrying a plurality of compact discs.

The following nine (9 prior art patents are found to be pertinent to the field of the present invention:

1. U.S. Pat. No. 4,432,477 issued to Haidt et al. on Feb. 21, 1984 for "Carrier For Music Player" (hereafter the "Haidt Patent");
2. U.S. Pat. No. 4,569,465 issued to O' Farrell on Feb. 11, 1986 for "Stereo Sport Belt" (hereafter the "O' Farrell Patent");
3. U.S. Pat. No. 4,620,653 issued to Farrell on Nov. 4, 1986 for "Adjustable Belt Stereo Player Holder" (hereafter the "Farrell Patent");
4. U.S. Pat. No. 4,834,274 issued to Johnson on May 30, 1989 for "Apparatus For Carrying A Cassette Tape Player And A Plurality Of Cassette Tapes On The Body Of A Person" (hereafter he "Johnson Patent");
5. U.S. Pat. No. 5,255,835 issued to Burks on Oct. 26, 1993 for "Runner's Writing Pad, Pencil And Recorder Pouch" (hereafter the "Burks Patent");
6. U.S. Pat. No. 5,353,975 issued to Libertucci on Oct. 11, 1994 for "Carrier For A Portable Stereo Unit" (hereafter the "Libertucci Patent");
7. U.S. Pat. No. 5,395,023 issued to Naymark et al. on Mar. 7, 1995 for "Multi-Purpose Carrier For Portable Electronic Photographic Equipment And The Like" (hereafter the "Naymark Patent");
8. U.S. Pat. No. 5,746,365 issued to Scott on May 5, 1998 for "Tape And Disc Carrying Device" (thereafter the "Scott Patent"); and
9. U.S. Pat. No. 6,056,174 issued to Minckler on May 2, 2000 for "Compact Disc Player Holster "(hereafter the "Minckler Patent").

The Haidt Patent discloses a carrier for a music player. It comprises an adjustable band which fits around a user's upper arm for carrying in a pocket of the band a musical tape player, radio or the like.

The O' Farrell Patent discloses a stereo sport belt adapted to carry a stereo unit comfortable and stable on the wearer's body during vigorous exercise. The belt includes a pair of neoprene bands partially overlapped and joined together at the overlap so as to form a symmetrical belt with a sleeve in the middle. The sleeve retains the stereo unit.

The Farrell Patent discloses an adjustable belt stereo player holder affixed about the waist of a person. The belt holder includes a pocket which retains a stereo radio or tape player having a cord and ear phones extending therefrom. In addition to the first pocket, a second pocket can be affixed to the belt holder for retaining a battery pack, small water bottle, keys or money.

The Johnson Patent discloses an apparatus for carrying a cassette tape player and a plurality of cassette tapes on the body of a person. It includes a belt which is secured about the body of the person, a tape player holder which holds a cassette tape player, three male snap elements in a triangular configuration mounted on the belt, and three female snap elements mounted on the tape player holder for engagement with the male snap elements to secure the tape player holder on the belt at the left or right hip area.

The Burks Patent discloses a runner's writing pad, pencil and recorder pouch.

The Libertucci Patent Discloses a carrier for a portable stereo unit. The carrier has multi-compartments for a portable stereo unit having separate speakers.

The Naymark Patent discloses a multipurpose carrier for portable electronic photographic equipment and the like.

The Scott Patent discloses a tape and disc carrying device. The device is a belt-type carrier which includes a two-layer belt adjustable for carrying multiple tapes or CDs.

The Minckler Patent discloses a compact disc player holster, where an individual is able to conveniently carry a compact disc player within the holster made from strap material which forms the various sides and layers of the holster. A CD case is positioned within a compartment of the holster. The holster allows unrestricted access to the buttons and switches of the compact disc player.

It is desirable to provide a portable carrying apparatus for holding and carrying a compact disc player along with a plurality of different compact discs with the capability of rapidly changing a different compact disc being listened too. It is also desirable to provide a portable carrying apparatus for carrying a compact disc player along with a plurality of different compact discs to provide optimum access to all of the available compact discs within the apparatus in a much more efficient way.

SUMMARY OF THE INVENTION

The present invention s a novel and unique portable carrying apparatus for holding and carrying a compact disc (CD) layer and a plurality of different compact discs.

The portable carrying apparatus comprises a top lid portion, a middle CD holding portion and a bottom CD player holding portion. All of the portions of the portable carrying apparatus are hingeably connected together so that they can be independently moved away from each other. The top lid portion is held in lace against the middle CD holding portion of the portable apparatus through attachment means. With the top lid portion moved upwardly and away, the CD holding portion which has a plurality of compact discs is exposed so that the user can take one or more of the compact disc and remove it from the CD holding portion. Thereafter, the CD holding portion itself can be moved away from the bottom CD player holding portion of the portable carrying apparatus. The CD holding portion is held; in place by attachment means on the back of the CD holding portion and the bottom CD player holding portion of the portable carrying apparatus. With the CD holding portion moved away and locked in place against the lid portion by attachment means the compact disc player itself is opened and the user can place the compact disc into the compact disc player and then push the selected buttons to start, stop, rewind, etc. The buttons the selves extend out from a distal end of the portable carrying apparatus. This further serves to retain the compact disc player within the portable carrying apparatus.

The compact disc player is press-fitted within the bottom CD player holding portion of the portable carrying apparatus is so that it is held firmly therein and will not fall out even when the CD holding portion is move away from the CD player holding portion so that a compact disc can be placed into the compact disc player. Once the compact disc is placed into the compact disc player, the CD holding portion is reaffixed to the bottom CD player holding portion of the portable carrying apparatus and then the top lid portion is reaffixed onto the CD holding portion.

There is provided an aperture along the side of the bottom CD player holding portion so that a conventional ear plug or headset can be connected to the compact disc player so that the user can listen to the music from the CD player while holding or walking with the present invention. The carrying apparatus further comprises a clip member which is attached to the back of the bottom CD player holder portion of the carrying apparatus. The clip member permits the entire carrying apparatus to be carried by clipping it to a person's belt or a portion of the person's clothing.

It is an object of the present invention to provide an apparatus for carrying a compact disc player along with a plurality of different compact discs with the capability of rapidly changing a different compact disc being listen too.

It is an additional object of the present invention to provide an apparatus for carrying a compact disc player along with a plurality of different compact discs to provide optimum access to all of the available compact discs retained within the apparatus in a much more efficient way.

It is a further object of the present invention to provide a portable carrying apparatus for carrying a compact disc player along with a plurality of different compact discs, wherein the apparatus includes a clip member which facilitates wearing the entire apparatus so that the user's hands are free and it functions the way a similar portable compact disc carrier functions but has the substantial added benefit of enabling the user to carry a plurality of compact discs.

It is another object of the present invention to provide a portable carrying apparatus for carrying a compact disc player and a plurality of different compact discs such that the apparatus is much more attractive and convenient than conventional compact disc holders which are usually bulky and give the appearance of being a purse or bag which most users find to be unattractive.

Therefore, what the portable carrying apparatus provides is a very attractive apparatus to enable consumers to want to purchase and wear the portable carrying apparatus. It affords a benefit over conventional portable compact disc players in that the holder carries a plurality of compact discs so that when a person is jogging, running, walking or engaged in other activity, they have all the compact discs that they may want to listen to handy in one convenient carrying apparatus which can be easily opened so that a compact disc can be inserted and then when the compact disc that they have listened to is completed, they can insert another disc and replace the first compact disc into the CD holding portion.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 4 is a perspective view of the present invention portable carrying apparatus, showing the top lid portion and the middle CD holding portion moved away from the bottom CD player holding portion;

FIG. 6 is an enlarged cross-sectional view taken along line 6—6 of FIG. 3.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
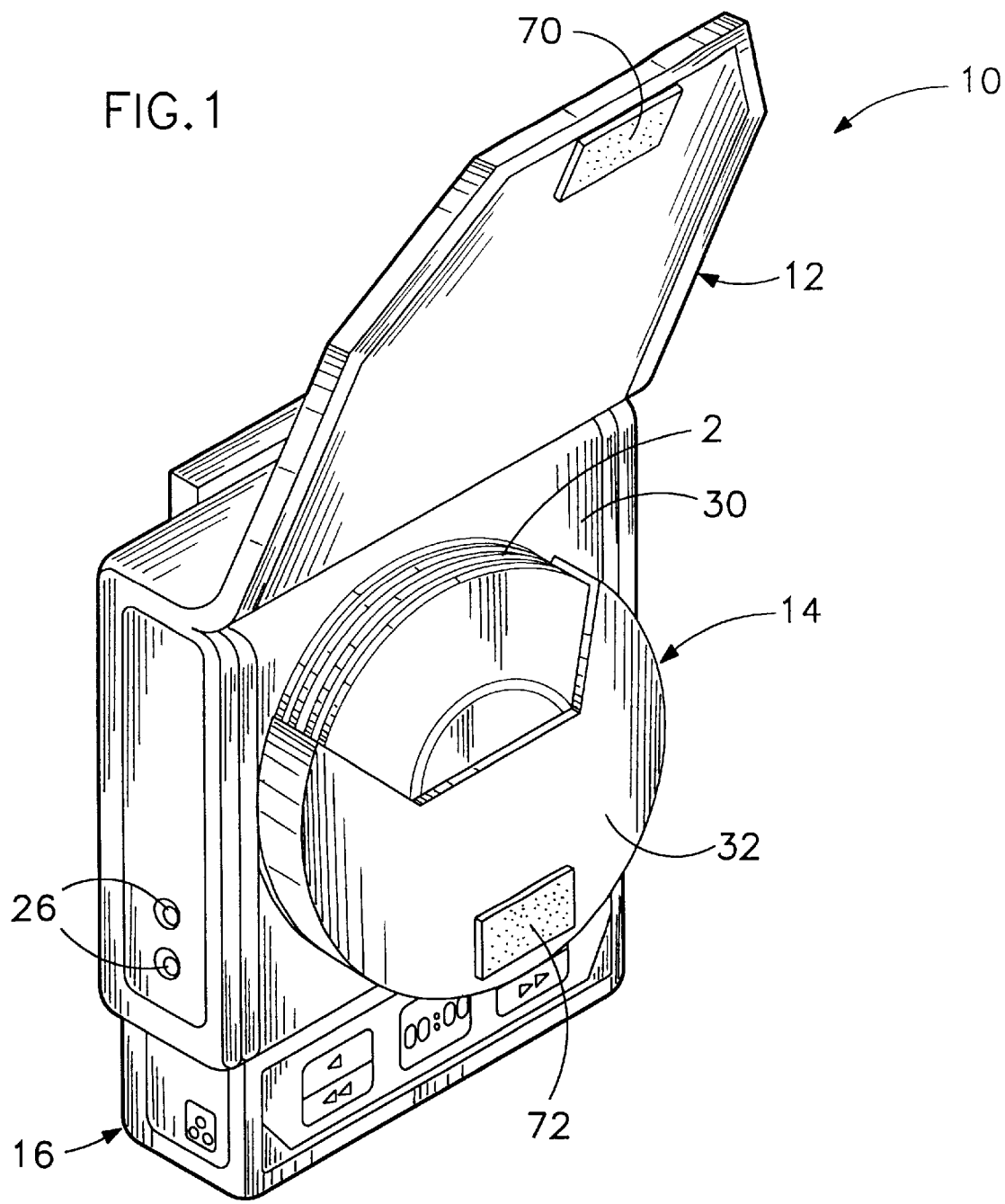
FIG. 1 is a perspective view of the present invention portable carrying apparatus, showing the top lid portion moved away from the middle compact disc holding portion.
Figure 2:
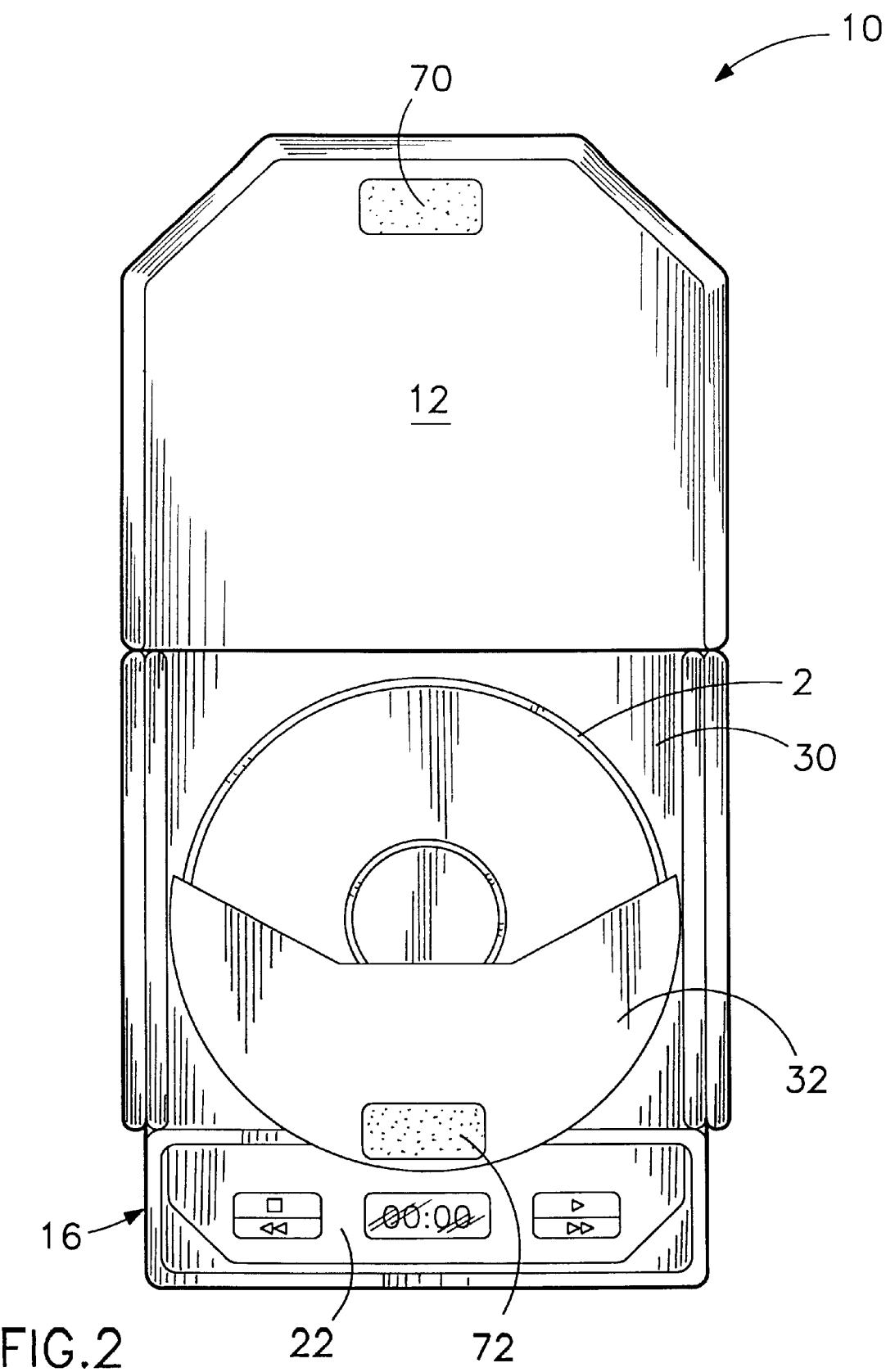
FIG. 2 is a top plan view of the present invention portable carrying apparatus, showing the lid portion in an open condition.

Referring to FIGS. 1 and 2, there is shown at 10 a portable carrying apparatus for holding and carrying a compact disc (CD) player and a plurality of different compact discs in accordance with the present invention. The portable carrying apparatus 10 comprises a top lid portion 12, a middle compact disc holding portion 14 and a bottom compact disc player holding portion 16. All of the portions 12, 14 and 16 of the portable carrying apparatus 10 are hingeably connected across the entire width at a proximal end 18 of the portable carrying apparatus so that the top lid portion 12 and the compact disc holding portion 14 can be pivotably open or closed. The portable carrying apparatus 10 is made of see-through flexible material, such as vinyl material or other suitable material that is flexible. The see-through material can also be colored to give it a more attractive appearance. The see-through material of the apparatus 10 allows someone using or wearing the apparatus to clearly see the compact discs 2 themselves as well as the compact disc player 4 while they are carrying the apparatus 10.

Referring to FIGS. 1 through 6, there is shown the compact disc player holding portion 16 which is sized and shaped to fit a standard compact disc player 4 therein. The compact disc player holding portion 16 comprises an open area 20 and a control area 22. The compact disc player 4 is inserted into the open area 20 and press-fitted within entire the bottom compact disc player holding portion 16 so that it is held firmly therein and will not fall out even when the compact disc holding portion 14 is moved away from the CD player holding portion 16 so that a compact disc 2 can be placed into the compact disc player 4. While the main part of the compact disc player 4 is located within the open area 20 of the CD player holding portion 16, the control buttons of the CD player 4 are located within the control area 22 of the CD player holding portion 16. The lid from the compact disc player 4 can be opened through the open area 20 of the CD player holding portion 16. The control buttons themselves extend out from a front distal end 24 of the portable carrying apparatus 10. Note that the present invention portable carrying apparatus 10 does not impede access to the control buttons of the compact disc player 4 and allows for the compact discs 2 to be changed without removal of the compact disc player 4 from the carrying apparatus 10. Once the compact disc 2 is placed into the compact disc player 4, the compact disc holding portion 14 is reaffixed to the bottom CD player holding portion 16 and then the top lid portion 12 is reaffixed onto the CD holding portion 14.

Figure 5:
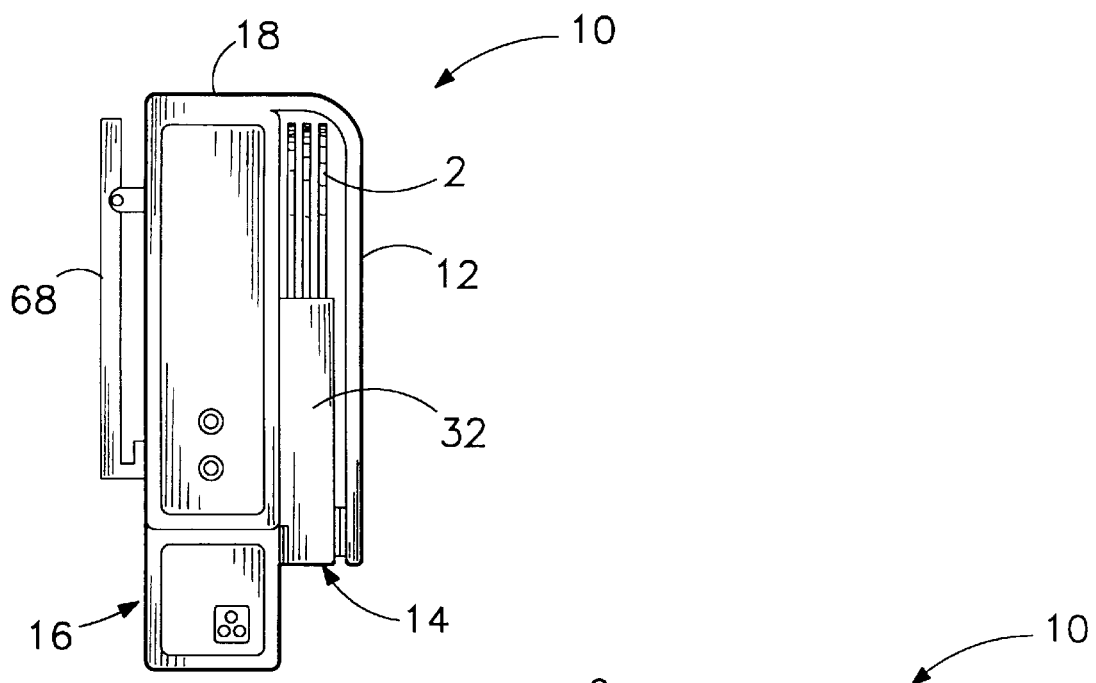
FIG. 5 is a side elevational view of the present invention portable carrying apparatus.
Figure 3:
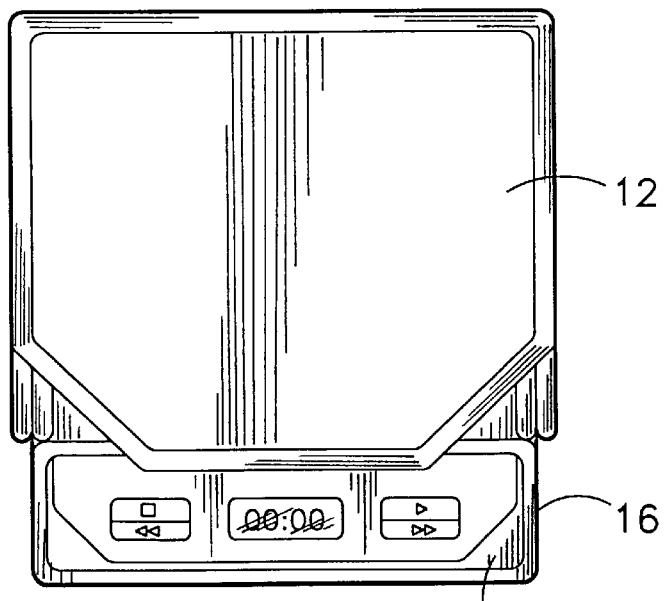
FIG. 3 is a top plan view of the present invention portable carrying apparatus, showing the lid portion in a closed condition.

Referring to FIGS. 1, 4 and 5, a conventional ear plug or headset (not shown) can be connected to the compact disc player 4 through apertures 26 located on the side of the CD player holding portion 16 so that the user can listen to the music from the compact disc 2 while holding or walking with the present invention portion carrying apparatus 10.

Referring to FIGS. 1, 2, 4, 5 and 6, the compact disc holding portion 14 is sized and shaped to snugly fit the plurality of compact discs 2 therein. The CD holding portion 14 is formed with a backing member 30 and a front protruding holding member 32 which is integrally attached to a surface of the backing member 30 to form a protruding pocket. The backing member 30 extends downwardly from the hinged location to the front distal end 24 of portable carrying apparatus 10 and covers the entire open area 20 of the CD player holding portion 16 and partially covers the control area 22. The front holding member 32 extends upwardly to a midsection of the backing member 30 and forms the protruding pocket 28. A plurality of spaced apart dividers 34 are integrally formed with the bottom of the CD holding portion 14 and extend upwardly to a midsection of the protruding holding member 32. These dividers 34 provide a separator for separating the compact discs 2 (see FIG. 6).

The top lid portion 12 is held in place against the middle compact disc holding portion 14 through attachment means such as mating VELCRO (flexible hook and loop fasteners) fasteners 70 and 72. The middle compact disc holding portion 14 is also held in place against the bottom compact disc player holding portion 16 through attachment means such as mating VELCRO fasteners 74 and 76. With the top lid portion 12 moved upwardly and away, the compact disc holding portion 14 which retains the plurality of compact discs 2 is exposed so that the user can take one or more of the compact discs 2 out and remove it from the compact disc holding portion 14. Thereafter, the compact disc holding portion 14 itself is moved away from the bottom CD player holding portion 16 of the carrying apparatus 10. The compact disc holding portion 14 is held in place by attachment means such as mating VELCRO fasteners on the back of the CD holding portion 14 and the front of the CD player holding portion 16. With the compact disc holding portion 14 moved away and locked in place against the top lid portion 12 by the VELCRO fasteners 70 and 72, the compact disc player 4 itself can be opened and the user can place the compact disc 2 into the compact disc player 4 and then push the selected buttons to start, stop, rewind, etc. The control buttons themselves extend out from the front distal portion of the portable carrying apparatus 10. Note that the present invention portable carrying apparatus 10 does not impede access to the control buttons of the compact disc player 4 and allows for the compact discs 2 to be changed without removal of the compact disc player 4 from the carrying apparatus 10.

Referring to FIGS. 5 and 6, there is shown at 68 a clipping means which is attached to the back or exterior side of the bottom CD player holding portion 16 and located adjacent to the proximal end 18 of the portable carrying apparatus 10. The clipping means 68 permits the portable carrying apparatus 10 to be carried by clipping it to a person's belt or a portion of the person's clothing, similar to a pager or beeper device. The clipping means 68 facilitates wearing the portable carrying apparatus 10 so that the user's hands are free and has the substantial added benefit of enabling the user to carry a plurality of compact discs 2.

The present invention conforms to conventional forms of manufacture or any other conventional way known to one skilled in the art, and is of simple construction and is easy to use.

Therefore, what the portable carrying apparatus provides is a very attractive device to enable consumers to carry the compact disc player. It afford's a benefit over conventional portable compact disc players in that the portable carrying apparatus carries a plurality of compact discs so that when a person is jogging, running, walking or engaged in other activity, they have all the compact discs that they may want to listen to handy in one convenient carrying apparatus which can be easily opened as discussed above so that a compact disc can be inserted and then when the compact disc that they have listened to is completed, they can insert another compact disc and replace the listened compact disc into the compact disc holding portion 14 of the portable carrying apparatus 10.

The present invention has many advantageous features including: (a) the portable carrying apparatus is much more attractive and convenient than conventional compact disc holders which are usually bulky and give the appearance of being a purse or bag which most users find to be unattractive; (b) the carrying apparatus is portable and can be clipped onto a belt or a portion of a pair of pants through a clipping means attached to the apparatus; and (c) the carrying apparatus is easily openable while it is being worn by the user so that the user can reach in and select a compact disc and after that, move away the series of compact discs that are being held to place the compact disc that is selected into the compact disc player and then pushing control buttons so that the compact disc player can play music while at the same time causing the entire device to be closed so that the user can be walking with the series of compact discs and a compact disc player and listening to the music on a selected compact disc. The present invention provides the benefit that instead of having just one compact disc that the person is listening to, the person can carry from 10 to 15 different compact discs and randomly select whichever one he or she wants while he or she is walking, jogging, etc.

Defined in detail, the present invention is a portable carrying apparatus for holding and carrying a compact disc (CD) player and a plurality of compact discs, the apparatus comprising: (a) a bottom CD player holding portion made of flexible material and having an open segment with a proximal end, a control segment with a distal end, an upper side and a bottom side, the bottom CD player holding portion sized and shaped for snugly retaining the CD player such that a lid of the CD player is open through the open segment and control buttons of the CD player are located within the control segment; (b) a middle CD holding portion made of flexible material and sized to cover the bottom CD player holding portion for snugly holding and carrying the plurality of compact discs therein, the CD holding portion having a proximal end hingeably connected to the proximal end of the bottom CD player holding portion and a distal end, the middle CD holding portion having a plurality of spaced apart dividers for separating the plurality of compact discs within the CD holding portion; (c) a top lid portion sized to cover the middle CD holding portion and made of flexible material, the top lid portion having a proximal end hingeably connected to the proximal ends of the holding portions, a distal end, an upper side and a bottom side; (d) clipping means attached to the bottom side of the bottom CD player holding portion and located adjacent to the proximal end for clipping the carrying apparatus to a user's belt or a portion of the user's clothing; (e) first fastener means attached to the upper side of the bottom CD player holding portion and located adjacent to the distal end; (f) second fastener means attached to the lower side of the middle CD holding portion and located adjacent to the distal end for mating with the first fastener to hold together the middle CD holding portion against the bottom CD player holding portion; (g) third fastener means attached to the upper side of the middle CD holding portion and located adjacent to the distal end; and (h) fourth fastener means attached to the lower side of the top lid portion and located adjacent to the distal end for mating with the third fastener to hold together the top lid portion against the middle CD holding portion; (i) whereby the top lid portion can be moved upwardly and away from the middle CD holding portion such that the plurality of compact discs are exposed so that the user can take one or more of the compact discs out and remove it from the CD holding portion, thereafter, the CD holding portion can be moved away and locked in place against the top lid portion by the third and fourth fastener means and the compact disc player itself can be opened and the user can place another one of the compact discs into the compact disc player and then push the control buttons through the control segment of the bottom CD player holding portion.

Defined broadly, the present invention is a carrying apparatus for holding and carrying a compact disc (CD) player and a plurality of compact discs, the apparatus comprising: (a) a CD player holding portion having an open segment with a proximal end, a control segment with a distal end, an upper side and a bottom side, the CD player holding portion sized and shaped for snugly retaining the CD player such that a lid of the CD player is open through the open segment and control buttons of the CD player are located within the control segment; (b) a CD holding portion for snugly holding and carrying the plurality of compact discs therein and having a proximal end hingeably connected to the proximal end of the CD player holding portion and a distal end, the CD holding portion having a plurality of spaced apart dividers for separating the plurality of compact discs within the CD holding portion; (c) a lid portion for covering the CD holding portion and having a proximal end hingeably connected to the proximal ends of the holding portions, a distal end, an upper side and a bottom side; (d) clipping means attached to the bottom side of the CD player holding portion and located adjacent to the proximal end for clipping the carrying apparatus to a user's belt or a portion of the user's clothing; (e) first fastener means attached to the upper side of the CD player holding portion; (f) second fastener means attached to the lower side of the CD holding portion for mating with the first fastener means to hold together the CD holding portion against the CD player holding portion; (g) third fastener means attached to the upper side of the CD holding portion; and (h) fourth fastener means attached to the lower side of the top lid portion for mating with the third fastener means to hold together the lid portion against the CD holding portion; (i) whereby the lid portion can be moved upwardly and away from the CD holding portion such that the plurality of compact discs are exposed so that the user can take one or more of the plurality of compact discs out and remove it from the CD holding portion, thereafter, the CD holding portion can be moved away and locked in place against the lid portion by the third and fourth fastener means and the compact disc player itself can be opened and the user can place another one of the compact discs into the compact disc player and then push the control buttons through the control segment of the CD player holding portion.

Defined more broadly, the present invention is a carrying apparatus for holding and carrying a compact disc (CD) player and a plurality of compact discs, the apparatus comprising: (a) a CD player holding portion for snugly retaining the CD player such that a lid of the CD player is open therethrough and having a proximal end; (b) a CD holding portion for snugly holding and carrying the plurality of compact discs therein and having a proximal end hingeably connected to the proximal end of the CD player holding portion; (c) a lid portion for covering the CD holding portion and having a proximal end hingeably connected to the proximal ends of the holding portions; (d) means for attaching the carrying apparatus to a user's belt or a portion of the user's clothing; (e) first fastener means attached to the CD player holding portion; (f) second fastener means attached to the CD holding portion for mating with the first fastener means to hold together the CD holding portion against the CD player holding portion; (g) third fastener means attached the CD holding portion; and (h) fourth fastener means attached to the lid portion for mating with the third fastener means to hold together the lid portion against the CD holding portion; (i) whereby the lid portion can be moved upwardly and away from the CD holding portion such that the plurality of compact discs are exposed so that a user can take one or more of the plurality of compact discs out and remove it from the CD holding portion, thereafter, the CD holding portion can be moved away and locked in place against the lid portion by the third and fourth fastener means and the compact disc player itself can be opened and the user can place another one of the compact discs into the compact disc player and then push the control buttons through the control segment of the CD player holding portion.

Defined even more broadly, the present invention is an apparatus for holding and carrying a compact disc (CD) player and a plurality of compact discs, the apparatus comprising: (a) a CD player holding member for snugly retaining the CD player such that a lid of the CD player is open therethrough and having a proximal end; (b) a CD holding member for snugly holding and carrying the plurality of compact discs therein and having a proximal end hingeably connected to the proximal end of the CD player holding member; (c) a lid member for covering the CD holding member and having a proximal end hingeably connected to the proximal ends of the holding members; and (d) means for maintaining the lid member against the CD holding member and the CD holding member against the CD player holding member; (e) whereby the lid member can be moved upwardly and away from the CD holding member such that the plurality of compact discs are exposed so that a user can take one or more of the plurality of compact discs out and remove it from the CD holding member, thereafter, the CD holding member can be moved away and locked in place against the lid member and the CD player itself can be opened and the user can place another one of the compact discs into the CD player.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A portable carrying apparatus for holding and carrying a compact disc (CD) player and a plurality of compact discs, the apparatus comprising:
   a. a bottom CD player holding portion made of flexible material and having an open segment with a proximal end, a control segment with a distal end, an upper side and a bottom side, the bottom CD player holding portion sized and shaped for snugly retaining said CD player such that a lid of said CD player is openable through the open segment and control buttons of said CD player are located within said control segment;
   b. a middle CD holding portion made of flexible material and sized to cover said bottom CD player holding portion for snugly holding and carrying said plurality of compact discs therein, the CD holding portion having a proximal end hingeably connected to said proximal end of said bottom CD player holding portion and a distal end, the middle CD holding portion having a plurality of spaced apart dividers for separating said plurality of compact discs within the CD holding portion;
   c. a top lid portion sized to cover said middle CD holding portion and made of flexible material, the top lid portion having a proximal end hingeably connected to said proximal ends of said holding portions, a distal end, an upper side and a bottom side;
   d. clipping means attached to said bottom side of said bottom CD player holding portion and located adjacent to said proximal end for clipping said carrying apparatus to a user's belt or a portion of the user's clothing;
   e. first fastener means attached to said upper side of said bottom CD player holding portion and located adjacent to said distal end;
   f. second fastener means attached to said lower side of said middle CD holding portion and located adjacent to said distal end thereof for mating with said first fastener means to hold together said middle CD holding portion against said bottom CD player holding portion;
   g. third fastener means attached to said upper side of said middle CD holding portion and located adjacent to said distal end thereof; and
   h. fourth fastener means attached to said lower side of said top lid portion and located adjacent to said distal end for mating with said third fastener to hold together said top lid portion against said middle CD holding portion;
   i. whereby said top lid portion can be moved upwardly and away from said middle CD holding portion such that said plurality of compact discs are exposed so that the user can take one or more of the compact discs out and remove it from said CD holding portion, thereafter, said CD holding portion can be moved away and locked in place against said top lid portion by said third and fourth fastener means and said lid of said compact disc player itself can be opened through said opened segment while said CD player remains snugly retained in said bottom CD player holding portion and the user can place another one of the compact discs into said compact disc player and then push said control buttons through said control segment of said bottom CD player holding portion.

2. The portable carrying apparatus in accordance with claim 1, further comprising apertures located on a side of said CD player holding portion for accessing an ear phone jack on said CD player.

3. The portable carrying apparatus in accordance with claim 1, wherein said flexible material is made from vinyl material.

4. The portable carrying apparatus in accordance with claim 1, wherein said first and third fastener means are a female fastener with a loop type surface and said second and fourth fastener means are a male fastener with a hook type surface.

5. The portable carrying apparatus in accordance with claim 1, wherein said first and third fastener means are a male fastener with a hook type surface and said second and fourth fastener means are a female fastener with a loop type surface.

6. A carrying apparatus for holding and carrying a compact disc (CD) player and a plurality of compact discs, the apparatus comprising:
   a. a CD player holding portion having an open segment with a proximal end, a control segment with a distal end, an upper side and a bottom side, the CD player holding portion sized and shaped for snugly retaining said CD player such that a lid of said CD player is openable through the open segment and control buttons of said CD player are located within said control segment;
   b. a CD holding portion for snugly holding and carrying said plurality of compact discs therein and having a proximal end hingeably connected to said proximal end of said CD player holding portion and a distal end, the CD holding portion having a plurality of spaced apart dividers for separating said plurality of compact discs within the CD holding portion;
   c. a lid portion for covering said CD holding portion and having a proximal end hingeably connected to said proximal ends of said holding portions, a distal end, an upper side and a bottom side;
   d. clipping means attached to said bottom side of said CD player holding portion and located adjacent to said proximal end for clipping said carrying apparatus to a user's belt or a portion of the user's clothing;
   e. first fastener means attached to said upper side of said CD player holding portion;
   f. second fastener means attached to said lower side of said CD holding portion for mating with said first fastener means to hold together said CD holding portion against said CD player holding portion;
   g. third fastener means attached to said upper side of said CD holding portion; and
   h. fourth fastener means attached to said lower side of said top lid portion for mating with said third fastener means to hold together said lid portion against said CD holding portion;
   i. whereby said lid portion can be moved upwardly and away from said CD holding portion such that said plurality of compact discs are exposed so that the user can take one or more of said plurality of compact discs out and remove it from said CD holding portion, thereafter, said CD holding portion can be moved away and locked in place against said lid portion by said third and fourth fastener means and said lid of said compact disc player itself can be opened through said open segment while said CD player remains snugly retained in said CD player holding portion and the user can place another one of said compact discs into said compact disc player and then push said control buttons through said control segment of said CD player holding portion.

7. The carrying apparatus in accordance with claim 6, further comprising apertures located on a side of said CD player holding portion for accessing an ear phone jack on said CD player.

8. The carrying apparatus in accordance with claim 6, wherein said lid portion, said CD holding portion and said CD player portion are made out of flexible material.

9. The carrying apparatus in accordance with claim 8, wherein said flexible material is made from vinyl material.

10. The carrying apparatus in accordance with claim 6, wherein said first and third fastener means are a female fastener with a loop type surface and said second and fourth fastener means are a male fastener with a hook type surface.

11. The carrying apparatus in accordance with claim 6, wherein said first and third fastener means are a male fastener with a hook type surface and said second and fourth fastener means are a female fastener with a loop type surface.

12. A carrying apparatus for holding and carrying a compact disc (CD) player and a plurality of compact discs, the apparatus comprising:
   a. a CD player holding portion for snugly retaining said CD player such that a lid of said CD player is openable therethrough while said CD player is snugly retained by said CD player holding portion and having a proximal end;
   b. a CD holding portion for snugly holding and carrying said plurality of compact discs therein and having a proximal end hingeably connected to said proximal end of said CD player holding portion;
   c. a lid portion for covering said CD holding portion and having a proximal end hingeably connected to said proximal ends of said holding portions;
   d. means for attaching said carrying apparatus to a user's belt or a portion of the user's clothing;
   e. first fastener means attached to said CD player holding portion;
   f. second fastener means attached to said CD holding portion for mating with said first fastener means to hold together said CD holding portion against said CD player holding portion;
   g. third fastener means attached to said CD holding portion; and
   h. fourth fastener means attached to said lid portion for mating with said third fastener means to hold together said lid portion against said CD holding portion;
   i. whereby said lid portion can be moved upwardly and away from said CD holding portion such that said plurality of compact discs are exposed so that a user can take one or more of said plurality of compact discs out and remove it from said CD holding portion, thereafter, said CD holding portion can be moved away and locked in place against said lid portion by said third and fourth fastener means and said lid of said compact disc player itself can be opened while said CD player remains snugly retained by said CD player holding portion and the user can place another one of said compact discs into said compact disc player and then push control buttons of said CD player while said CD player remains snugly retained by said CD player holding portion.

13. The carrying apparatus in accordance with claim 12, further comprising apertures located on a side of said CD player holding portion for accessing an ear phone jack on said CD player.

14. The carrying apparatus in accordance with claim 12, wherein said lid portion, said CD holding portion and said CD player portion are made out of flexible material.

15. The carrying apparatus in accordance with claim 14, wherein said flexible material is made from vinyl material.

16. The carrying apparatus in accordance with claim 12, wherein said first and third fastener means are a female fastener with a loop type surface and said second and fourth fastener means are a male fastener with a hook type surface.

17. The carrying apparatus in accordance with claim 12, wherein said first and third fastener means are a male fastener with a hook type surface and said second and fourth fasteners are a female fastener with a loop type surface.

18. The carrying apparatus in accordance with claim 12, wherein said CD holding portion further comprises a plurality of spaced apart dividers for protecting and separating said plurality of compact discs within said CD holding portion.

19. The carrying apparatus in accordance with claim 12, wherein said means for attaching said carrying apparatus to a user's belt or a portion of the user's clothing includes a clipping member.

20. An apparatus for holding and carrying a compact disc (CD) player and a plurality of compact discs, the apparatus comprising:
   a. a CD player holding member for snugly retaining said CD player such that a lid of said CD player is open openable therethrough while said CD player is snugly retained by said CD player holding member and having a proximal end;
   b. a CD holding member for snugly holding and carrying said plurality of compact discs therein and having a proximal end hingeably connected to said proximal end of said CD player holding member;
   c. a lid member for covering said CD holding member and having a proximal end hingeably connected to said proximal ends of said holding members; and
   d. means for maintaining said lid member against said CD holding member and said CD holding member against said CD player holding member;
   e. whereby said lid member can be moved upwardly and away from said CD holding member such that said plurality of compact discs are exposed so that a user can take one or more of said plurality of compact discs out and remove it from said CD holding member, thereafter, said CD holding member can be moved away and locked in place against said lid member by said maintaining means and said lid of said CD player itself can be opened while said CD player remains snugly retained by said CD player holding member and the user can place another one of said compact discs into said CD player.

21. The apparatus in accordance with claim 20, further comprising apertures located on a side of said CD player holding member for accessing an ear phone jack on said CD player.

22. The apparatus in accordance with claim 20, wherein said lid member, said CD holding member and said CD player holding member are made of flexible material.

23. The apparatus in accordance with claim 22 wherein said flexible material is made from vinyl material.

24. The apparatus in accordance with claim 20, wherein said means for maintaining said lid member against said CD holding member and said CD holding member against said CD player holding member include first fastener means attached to said CD player holding member, second fastener means attached to said CD holding member for mating with the first fastener means to hold together said CD holding member against said CD player holding member, third fastener means attached to said CD holding member, and fourth fastener means attached to said lid member for mating with said third fastener means to hold together said lid member against said CD holding member.

25. The apparatus in accordance with claim 24, wherein said first and third fastener means are a female fastener with a loop type surface and said second and fourth fastener means are a male fastener with a hook type surface.

26. The apparatus in accordance with claim 20, wherein said first and third fastener means are a male fastener with a hook type surface and said second and fourth fastener means are a female fastener with a loop type surface.

27. The apparatus in accordance with claim 20, wherein said CD holding member further comprises a plurality of spaced apart dividers for protecting and separating said plurality of compact discs within said CD holding member.

28. The apparatus in accordance with claim 20, further comprising means for attaching said carrying apparatus to a user's belt or a portion of the user's clothing.

29. The apparatus in accordance with claim 28, wherein said means for attaching said carrying apparatus to a user's belt or a portion of the user's clothing includes a clipping member.

* * * * *